Jan. 29, 1929.

L. G. COPEMAN 1,700,156

METHOD OF MAKING STONE CASTINGS

Filed Jan. 28, 1926

INVENTOR.
Lloyd G. Copeman
By Stuart C. Barnes
ATTORNEY.

Patented Jan. 29, 1929.

1,700,156

UNITED STATES PATENT OFFICE.

LLOYD G. COPEMAN, OF FLINT, MICHIGAN, ASSIGNOR TO COPEMAN LABORATORIES COMPANY OF FLINT, MICHIGAN, A CORPORATION OF MICHIGAN

METHOD OF MAKING STONE CASTINGS.

Application filed January 28, 1926. Serial No. 84,513.

This invention relates to a method of separating the cores from the cement casting, especially the castings that are made for a stone refrigerator.

In my prior patent, to wit: No. 1,548,469, I have shown and described a refrigerator built of stone, and preferably moulded stone. These refrigerators are preferably constructed of an oxy-chloride cement. I have found it necessary to use a special parting material in separating the cores from the casting. This is ordinarily some greasy or fatty substance, such as stearic acid. The core, before it is put into the mould, is covered with a film of this stearic acid. When the casting has been completed and set, the core is drawn from the mould by heating the core. This melts the stearic acid and the same runs into the pores left in the surface of the casting. It is found in production to be a difficult and a laborious task to remove the greasy substance from the surface of the stone. I have adopted a new way of casting these refrigerator shells which entirely eliminates the parting material and further compacts and makes a smoother surface for the stone.

Another feature of my new process is that by the agitation and shaking of the mould, especially immediately after the same is poured, I can separate out a considerable quantity of the excess magnesium chloride. This gives a better bond and setting of the mixture, as will be more fully explained hereafter. Furthermore, by this shaking action I further eliminate troublesome air pockets which tend to pock the surface.

As explained in one of my previous patents, I utilize a plastic mixture which is preferably so thin as to readily pour, preferably I use a mixture of 20% magnesium oxide by weight, 30% finely ground silica by weight, and 50% of fifty-mesh silica sand by weight. To this dry mix is added sufficient magnesium chloride in solution at 26° Baumé density to form a mixture that will easily pour. Now this mixture contains a larger percentage of the solution of magnesium chloride than is necessary to get the best results in setting.

I use this large amount of magnesium chloride so as to make the substance thin enough to pour, otherwise the moulds could not be filled properly and the entrapment of air would not be avoided. It is necessary, in order to get results, to utilize a magnesium chloride solution of a strength which will bring a density of 26° Baumé.

When this so-called oxy-chloride cement is applied with a trowel a very much dryer mixture is always used and very good results are obtained in setting and the resulting stone work. This, I believe, is because a very much less amount of magnesium chloride is used to the percentage of other ingredients. In other words, where a pouring solution is used, such as I have indicated in my prior patents and applications, there is considerable excess of magnesium chloride than is actually necessary in order to get the proper bond in setting. This in accordance with prior methods, has been a necessity, but nevertheless, somewhat of an evil. One of the chief results of my new process is the elimination of this excess in the way I am just about to describe.

Figure 1:
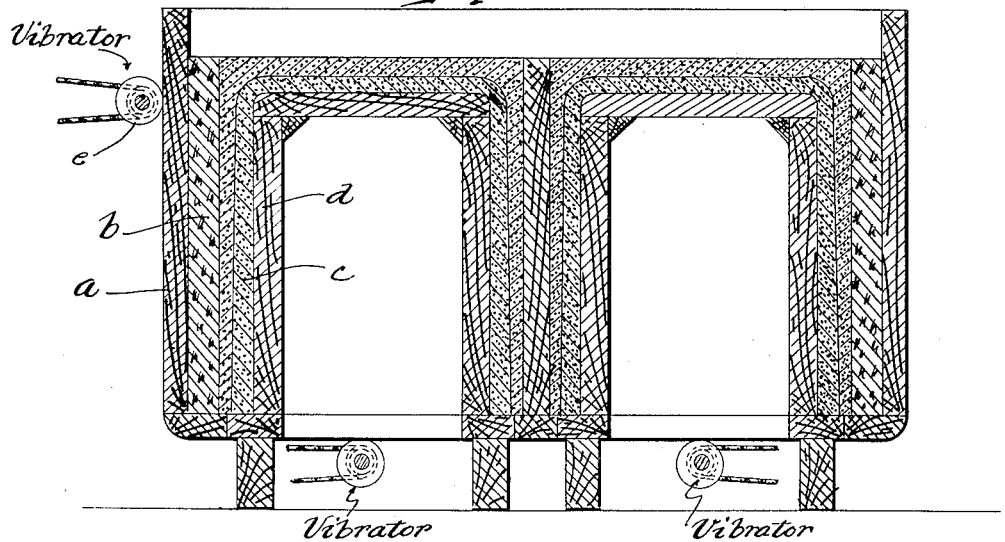
Fig. 1 is a vertical section showing the mould, the cores and the vibrators.
Figure 2:
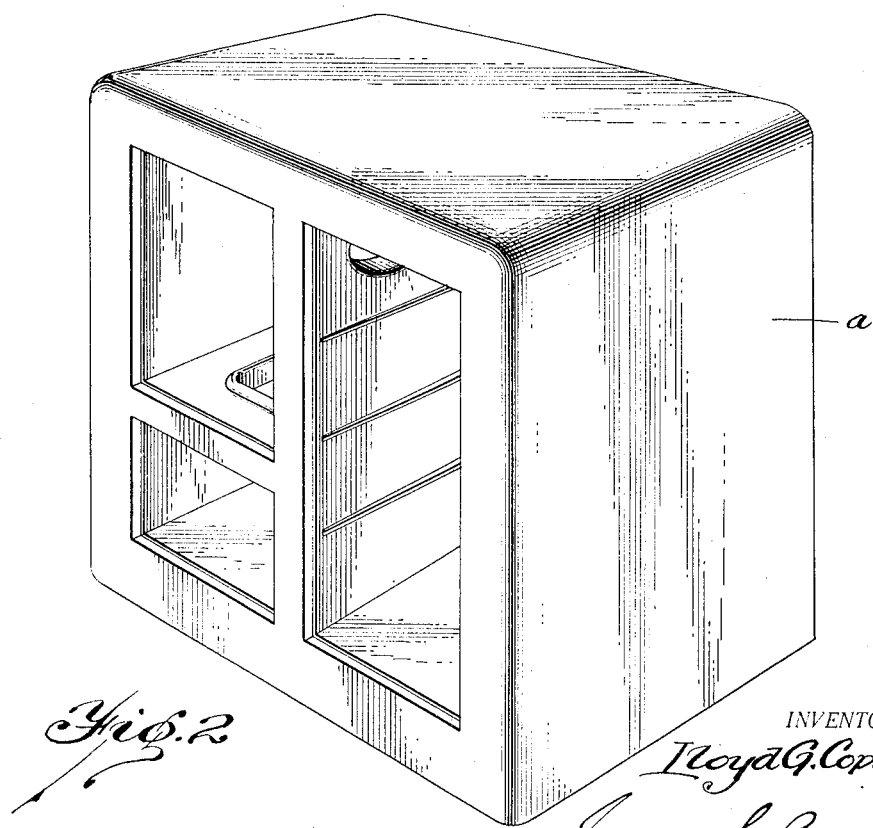
Fig. 2 is a perspective view of the finished refrigerator without the cores.

The core, which is preferably a cast stone of this same oxy-chloride cement, is initially coated with this stearic acid, but the excess is wiped off, and this is not used as a fusible parting material in the way heretofore done, and indicated above. The core is positioned in its accustomed place. The mould here shown is designated $a$ that is the outside wooden shell of the refrigerator itself to which is glued or fitted the cork boards $b$. The cement cores are designated $c$, and are preferably cement encasing a wooden frame work $d$. When these several parts are in place, as is indicated roughly in Fig. 1, the same may be poured from the back. The mixture will settle in the space between the cores and the cork board of the mould after this pouring, preferably a large vibrator designated $e$ is applied to the outside shell. This vibrator is only indicated in a sort of a graphic showing and the construction might be entirely different. It is simply the purpose here to show the application of a vibrator for shaking the work. This vibrator vibrates the mould and causes the liquid mixture to shift back and forth, and force out any entrapped air which may tend to adhere to the surface, especially of the cores, and thereby leave a pock in the casting.

Furthermore, I have discovered that this vibrating action has a rather unusual effect in causing the excess magnesium chloride solution to work to the top where it may be dipped off or taken off by a sponge. This eliminates an excess ingredient which is really a detriment in the setting of the casting.

When the casting begins to harden and take a real set the vibration of the outer shell having ceased some considerable time before, a second vibration is imparted to the cores, preferably I use a smaller vibrator and attach one to each core. This prevents the cementitious material setting directly to the surface of the stone core and compacts the casting on its interior surface, which is the only exposed surface of the finished work. This gives it a very much finer grain and keeps the core absolutely free from the casting so that it may be easily withdrawn without the use of parting material. Hence, not only is the grain of the exposed surface much finer and superior, but there is no objectionable hard material to remove from the casting.

What I claim is:

A method of making an article of manufacture which includes in its make-up a portion of artificial stone which comprises pouring a plastic mix into a mold, utilizing a portion of the article as a mold wall, vibrating the mold while the plastic mix is wet to insure proper setting of the mix, and vibrating the mold part which is to be removed from the stone to separate this part from the cast stone and permitting the mold portion formed by a part of the article to remain attached to the cast stone.

In testimony whereof I have affixed my signature.

LLOYD G. COPEMAN.